US012596038B2

(12) United States Patent (10) Patent No.: US 12,596,038 B2
Melnychuk et al. (45) Date of Patent: Apr. 7, 2026

(54) DISTRIBUTED TEMPERATURE SENSING SYSTEM WITH FIBER BRAGG GRATINGS

(71) Applicant: PRECISE DOWNHOLE SERVICES LTD., Nisku (CA)

(72) Inventors: Michael Melnychuk, Nisku (CA); Daniel Keough, Nisku (CA); Aleksei Andriianov, Nisku (CA); Sean Begley, Nisku (CA)

(73) Assignee: Precise Downhole Services Ltd., Nisku (CA)

(*) Notice: Subject to any disclaimer, the term of this patent is extended or adjusted under 35 U.S.C. 154(b) by 324 days.

(21) Appl. No.: 18/324,692

(22) Filed: May 26, 2023

(65) Prior Publication Data

US 2023/0384172 A1 Nov. 30, 2023

Related U.S. Application Data

(60) Provisional application No. 63/346,237, filed on May 26, 2022.

(51) Int. Cl.
*G01K 11/32* (2021.01)
*G01K 11/3206* (2021.01)

(52) U.S. Cl.
CPC .......... *G01K 11/3206* (2013.01); *G01K 11/32* (2013.01)

(58) Field of Classification Search
CPC ... G01K 11/3206; G01K 11/32; G01K 15/005
See application file for complete search history.

(56) References Cited

U.S. PATENT DOCUMENTS

| | | | | |
|---|---|---|---|---|
| 6,807,324 | B2* | 10/2004 | Pruett | .................... G01K 11/32 |
| | | | | 374/E11.015 |
| 7,808,471 | B2* | 10/2010 | Shin | ..................... G09G 3/3266 |
| | | | | 377/64 |
| 8,090,227 | B2* | 1/2012 | Skinner | ................ G02B 6/3827 |
| | | | | 166/305.1 |
| 10,221,677 | B2* | 3/2019 | Skinner | ................ G02B 6/4427 |
| 2003/0234921 | A1* | 12/2003 | Yamate | .................. G01K 11/32 |
| | | | | 356/73.1 |
| 2006/0239330 | A1* | 10/2006 | Yamate | .................. G01K 11/32 |
| | | | | 374/161 |
| 2009/0260501 | A1* | 10/2009 | Kashyap | ................ G01H 9/004 |
| | | | | 84/297 S |
| 2011/0157671 | A1* | 6/2011 | Koplow | ............... G02B 27/288 |
| | | | | 372/18 |

(Continued)

FOREIGN PATENT DOCUMENTS

| | | |
|---|---|---|
| CA | 2709689 A1 | 7/2009 |
| CA | 2709698 C | 5/2013 |
| WO | 2009085044 | 7/2009 |

*Primary Examiner* — Laura Martin
*Assistant Examiner* — Philip L Cotey
(74) *Attorney, Agent, or Firm* — Bennett Jones LLP

(57) ABSTRACT

A system and method for calibrating a distributed temperature sensing (DTS) system having a fiber optic receiver coupled to an optical fiber, includes fiber Bragg gratings (FBGs) integrally formed within the optical fiber, and a processor configured to compute a temperature datum for a location of each FBG based on signals generated by the fiber optic receiver in response to light reflections from the FBG; and adjusting a computed temperature data profile along the optical fiber segment, based on the computed temperature datum for each location of an FBG.

12 Claims, 5 Drawing Sheets

(56)                    References Cited

U.S. PATENT DOCUMENTS

| | | | |
|---|---|---|---|
| 2011/0292965 A1* | 12/2011 | Mihailov | G01K 11/3206 |
| | | | 374/121 |
| 2014/0119687 A1* | 5/2014 | Hao | G08B 13/124 |
| | | | 385/12 |
| 2014/0318273 A1* | 10/2014 | Dong | G01K 11/3206 |
| | | | 374/161 |
| 2016/0168980 A1* | 6/2016 | Bedry | G01K 15/005 |
| | | | 374/136 |
| 2016/0223414 A1* | 8/2016 | Hao | G02B 6/02209 |
| 2021/0173111 A1* | 6/2021 | Therrien | E21B 47/113 |
| 2023/0184597 A1* | 6/2023 | LeBlanc | G01K 11/324 |
| | | | 374/161 |

* cited by examiner

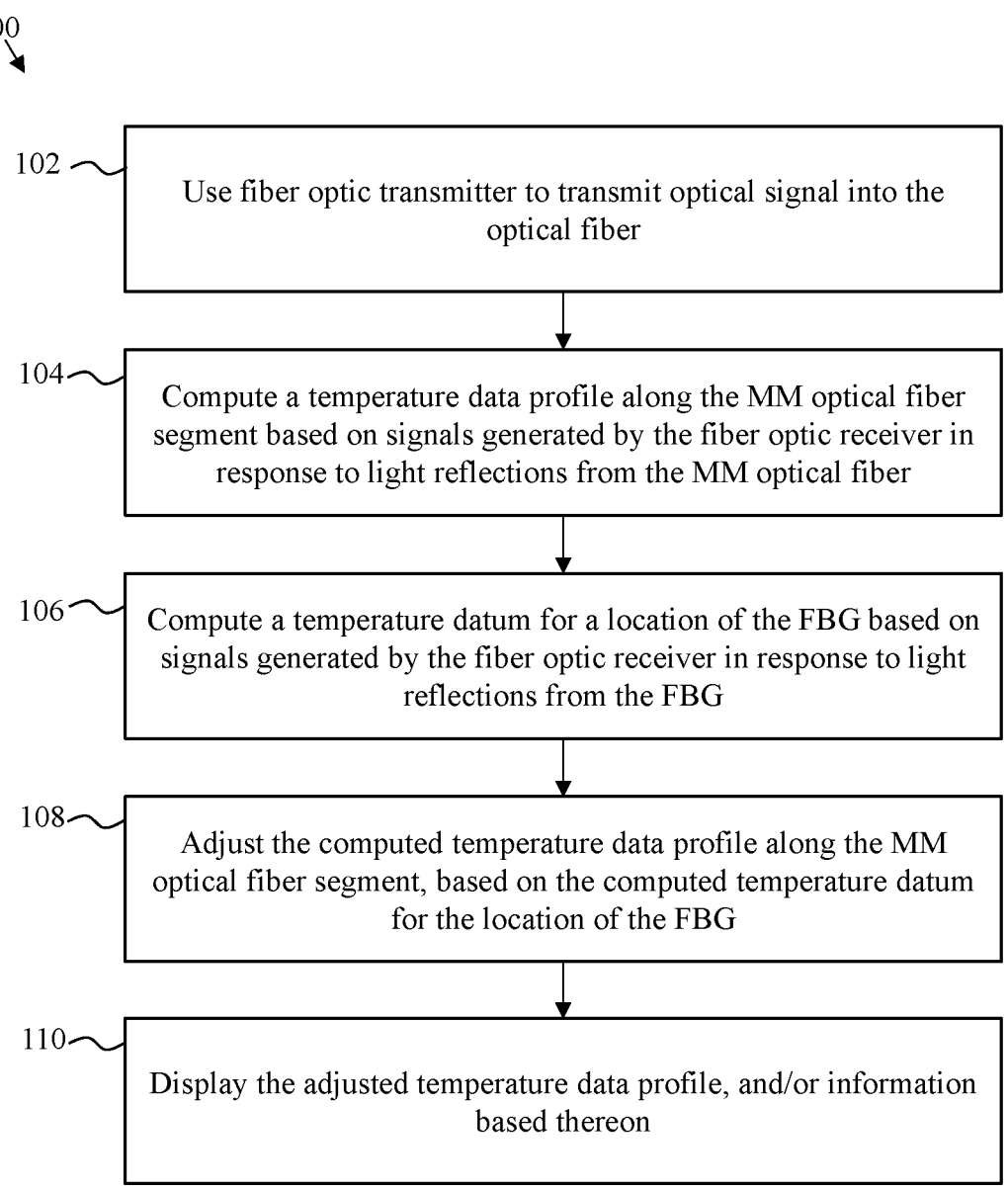

100

102 — Use fiber optic transmitter to transmit optical signal into the optical fiber 104 — Compute a temperature data profile along the MM optical fiber segment based on signals generated by the fiber optic receiver in response to light reflections from the MM optical fiber 106 — Compute a temperature datum for a location of the FBG based on signals generated by the fiber optic receiver in response to light reflections from the FBG 108 — Adjust the computed temperature data profile along the MM optical fiber segment, based on the computed temperature datum for the location of the FBG 110 — Display the adjusted temperature data profile, and/or information based thereon

FIG. 2

| FBG | Nominal $\lambda_B$ (nm) | Target temperature | | | | | | | |
| | | 50 ° C | | 120 ° C | | 190° C | | 260 ° C | |
| | | Shifted $\lambda_B$ (nm) | T (°C) | Shifted $\lambda_B$ (nm) | T (°C) | Shifted $\lambda_B$ (nm) | T (°C) | Shifted $\lambda_B$ (nm) | T (°C) |
|---|---|---|---|---|---|---|---|---|---|
| 1 | 1460.000 | 1460.282 | 52.6851 | 1461.0009 | 121.0378 | 1461.838 | 189.5124 | 1462.647 | 255.3586 |
| 2 | 1463.987 | 1464.348 | 52.6806 | 1465.078 | 121.2920 | 1465.905 | 189.5124 | 1466.732 | 255.5673 |
| ... | ... | ... | ... | ... | ... | ... | ... | ... | ... |
| 40 | 1616.037 | 1616.389 | 52.5902 | 1617.221 | 121.5811 | 1618.110 | 187.8512 | 1619.070 | 257.2987 |

FIG. 5

DISTRIBUTED TEMPERATURE SENSING SYSTEM WITH FIBER BRAGG GRATINGS

This application claims the priority benefit of U.S. Provisional Patent Application No. 63/346,237, filed on May 26, 2022, the entire contents of which are incorporated herein by reference.

FIELD OF THE INVENTION

The present invention relates to calibration of distributed temperature sensing (DTS) systems using optical fibers, and calibration of fiber Bragg gratings (FBGs) for use as temperature sensors.

BACKGROUND OF THE INVENTION

Distributed temperature sensing (DTS) systems are used to determine temperature profiles in environments such as a well bore. A laser transmits a light pulse into an optical fiber extending into the well bore. The light pulse reflects (backscatters) along the optical fiber to a fiber optic receiver and processing unit at the surface. The local temperature conditions at different depths of the well bore affect the local optical characteristics of the optical fiber, which results in reflections with different local shifts due to the Raman scattering effect. The reflections relative to the pulsed light are shifted in accordance with the temperature of the atoms along the fiber. The backscattered light is processed as a function of time to derive temperature as a function of well depth, with earlier backscatter indicating the temperature at relatively shallow depths, and later backscatter indicating the temperature at relatively deep depths. Such time-to-depth conversion is possible because the speed at which light travels through the fiber is known. The processing unit analyzes the reflected light to detect these amplitude shifts to compute a temperature profile along the length of the optical fiber.

The accuracy of the temperature profile may decrease for a variety of reasons, including degradation of the optical fiber when exposed to high temperatures, high pressures, and residual moisture and liquids within the well bore and other wellbore effects. U.S. Pat. No. 6,807,324 (Pruett; Oct. 19, 2004) describes using a fiber Bragg grating (FBG) sensor as calibration temperature sensor on a calibration line that is adjacent to the optical fiber sensing line of the DTS system. The calibration line and sensing line are coupled in parallel on a common cable or provided on separate parallel cables. In either case, this approach suffers from the complexity of having to provide a calibration line in addition to the sensing line.

SUMMARY OF THE INVENTION

In one aspect, the invention may comprise a method for calibrating a distributed temperature sensing (DTS) system comprising a fiber optic transceiver coupled to an optical fiber deployed in a well bore, the method comprising the steps of:

(a) providing at least one Fiber Bragg grating (FBG) within the optical fiber;

(b) transmitting a light pulse into the optical fiber and receiving backscattered light;

(c) using the processor, computing a temperature datum for a location of each of the at least one FBG based on signals generated by the fiber optic transceiver in response to light reflections from the FBG; and (d) using the processor, adjusting a computed temperature data profile along the optical fiber, based on the computed temperature datum for the location of the at least one FBG.

In some embodiments, the optical fiber may comprise a single mode (SM) fiber or a multimode (MM) fiber, or a combination of SM and MM fiber segments. In a preferred embodiment, the optical fiber comprises a SM fiber segment spliced to a MM fiber segment, and the SM fiber segment comprises the at least one FGB.

In another aspect, the invention may comprise a system for calibrating a distributed temperature sensing (DTS) system comprising a fiber optic transceiver coupled to an optical fiber, the system comprising:

(a) at least one fiber Bragg grating (FBG) integrally formed within the optical fiber;

(b) a processor operatively connected to the fiber optic transceiver, and a non-transient computer readable medium storing instructions executable by the processor to implement a method comprising the steps of:

(i) computing a temperature datum for a location of each of the at least one FBG based on signals generated by the fiber optic transceiver in response to light reflections from the FBG; and (ii) adjusting a computed temperature data profile along the optical fiber segment, based on the computed temperature datum for the location of the at least one FBG.

In some embodiments, the optical fiber may comprise a single mode (SM) fiber or a multimode (MM) fiber, or a combination of SM and MM fiber segments. In one embodiment, the optical fiber comprises a SM fiber segment spliced to a MM fiber segment, and the SM fiber segment comprises the at least one FGB.

In another aspect, the invention may comprise an optical fiber comprising: a multi-mode (MM) optical fiber segment; and a single-mode (SM) optical fiber segment comprising at least one Bragg grating (FBG), and spliced to an end of the MM optical fiber segment. In some embodiments, the at least one FBG comprises a plurality of FBGs spaced apart from each other along the SM optical fiber segment. In some embodiments, a nominal Bragg wavelength of one of the FBGs differs from a nominal Bragg wavelength of another one of the FBGs.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 2 is a flow chart showing an embodiment of a method for computing and calibrating a temperature data profile computed using the DTS system of FIG. 1.

FIG. 5 is a table showing a paired dataset of temperatures and shifted Bragg wavelengths of FBGs used to calibrate FBGs for use as temperature sensors.

DETAILED DESCRIPTION OF THE INVENTION

Definitions. The invention relates to distributed temperature sensing (DTS) systems using optical fibers. Any term or expression not expressly defined herein shall have its commonly accepted definition understood by a person skilled in the art.

"Memory" refers to a non-transitory tangible computer-readable medium for storing information in a format readable by a processor, and/or instructions readable by a processor to implement an algorithm. The term "memory" includes a plurality of physically discrete, operatively connected devices despite use of the term in the singular. Non-limiting types of memory include solid-state, optical, and magnetic computer readable media. Memory may be non-volatile or volatile. Instructions stored by a memory may be based on a plurality of programming languages known in the art, with non-limiting examples including the C, C++, Python™, MATLAB™, and Java™ programming languages.

"Processor" refers to one or more electronic devices that is/are capable of reading and executing instructions stored on a memory to perform operations on data, which may be stored on a memory or provided in a data signal. The term "processor" includes a plurality of physically discrete, operatively connected devices despite use of the term in the singular. Non-limiting examples of processors include devices referred to as microprocessors, microcontrollers, central processing units (CPU), and digital signal processors.

Figure 1:
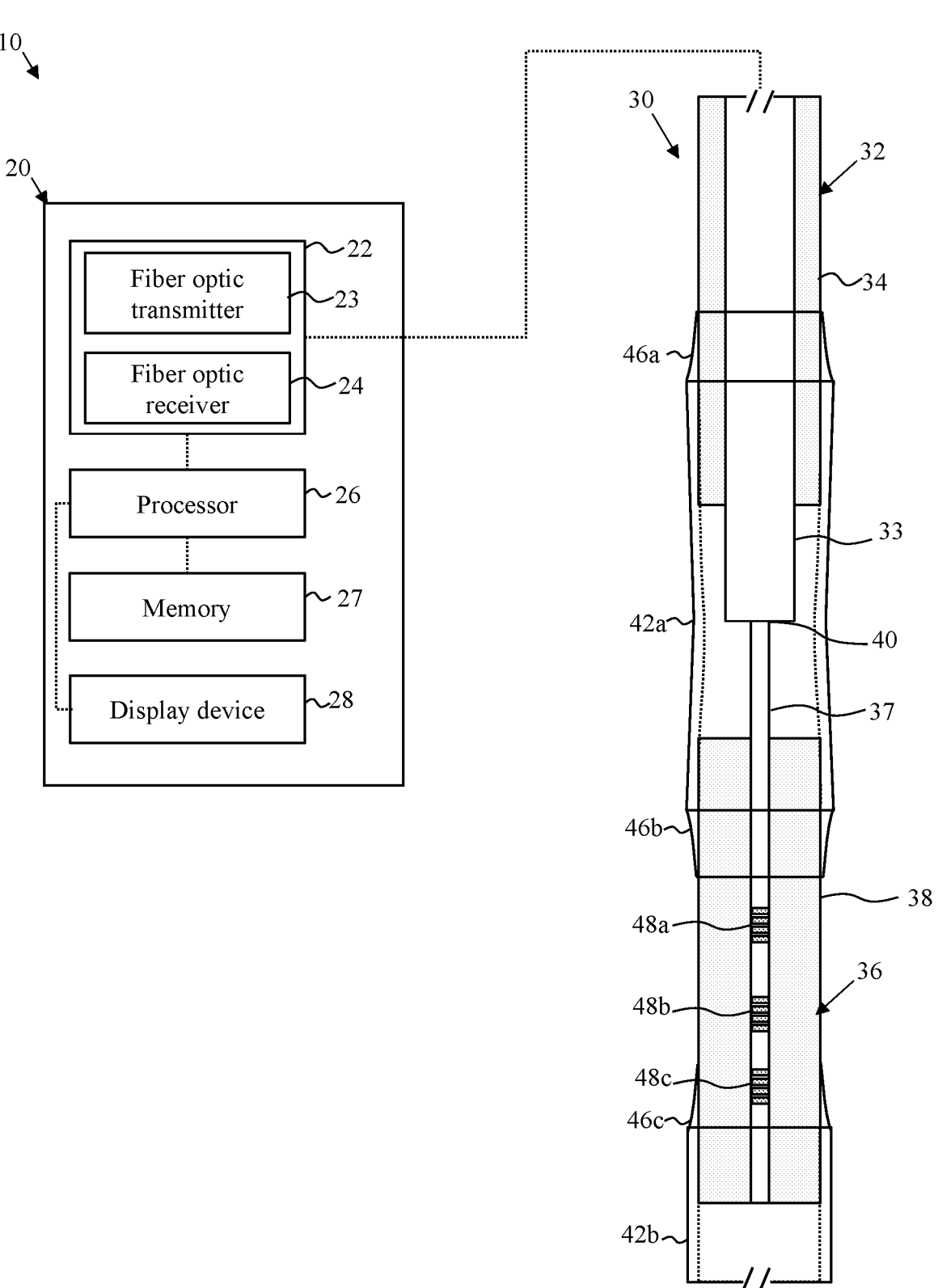
FIG. 1 is a schematic drawing of a DTS system of the present invention including a processing unit and an optical fiber.

DTS and FBG System. FIG. 1 shows an embodiment of a DTS system (10) including a processing unit (20) and an operatively connected optical fiber (30). The processing unit (20) includes a fiber optic transceiver (22) including a fiber optic transmitter (23) and a fiber optic receiver (24). The fiber optic transmitter (23) uses a light source such a laser or light emitting diode to convert electrical signals to optical signals that are transmitted into the optical fiber (30). In some embodiments, the optical fiber may comprise a single-mode (SM) fiber or a multi-mode (MM) fiber, or a combination of SM and MM segments spliced together. At least one integrally formed fiber Bragg grating (FBG) is provided along the length of the optical fiber, such as at the distal end of the optical fiber.

The fiber optic receiver (24) uses semiconductor devices such as photodiodes and photodetectors to convert optical signals received from the optical fiber (30) to electrical signals. Fiber optic transceivers (22) are known in the art and commercially available. The processing unit (20) includes a processor (26) operatively connected to the fiber optic transceiver (22) and a memory (27) storing instructions executable by the processor (26) to implement methods for computing temperatures based on signals generated by the fiber optic receiver (24) in response to optical signals from the optical fiber (30).

A processing unit (20) comprises both a Raman processing unit which processes optical signals from the optical fiber in accordance with Raman scattering phenomena, and a Brillouin processing unit which processes optical signals from fiber Bragg gratings in accordance with Brillouin scattering phenomena. The computations by which the processing unit(s) derive temperature data are known in the art, and do not by themselves constitute the present invention. The Raman and Brillouin processing units may be separate units and connected to the optical fiber by an optical switch, or may be a hybrid unit configured to process the optical signals in series or in parallel.

Although FIG. 1 shows the processor (26) and memory (27) as a single block, they may comprise a plurality of discrete components, such as a microprocessor with firmware attached to the fiber optic transceiver (22) and an operatively connected general purpose computer (e.g., a desktop, laptop, tablet, or smartphone computer) running software stored on a local memory or remote networked server. The processing units (20) also includes a display device (28) operatively connected to the processor (26) for displaying information in graphical form relating to the computed temperature profile and its calibration. The processing unit (20) may include or be connected to a power supply (not shown), and further include input devices (not shown) such as a keyboard, computer mouse, or touch screen operatively connected to the processor.

In one embodiment, the optical fiber (30) comprises a multi-mode (MM) optical fiber segment (32) and a single-mode (SM) optical fiber segment (36) connected to the end of the MM optical fiber segment by a splice (40). The MM optical fiber segment (32) and the SM optical fiber segment (34) have light transmitting cores (33) and (37), respectively, surrounded by a reflective cladding (34) and (38), respectively, which may include buffer and jacket layers. As known in the art, MM optical fiber and SM optical fiber are distinguished by the diameter of their cores; MM optical fiber segment (32) has a core (33) with a diameter of about 50 μm to 62.5 μm, allowing for light transmission in multiple rays, whereas SM optical fiber segment (36) has a core (37) with a diameter of about 9 μm, allowing for light transmission with less rays. The splice (40) is an optically transmitting connection between the cores (33) and (37), such as a fusion splice. Splicing an MM optical fiber to an SM optical fiber is known to create issues with signal loss, but it has been found that the spliced optical fiber (30) remains effective for its intended purpose, even at lengths of about 2000 meters or more.

In the embodiment of FIG. 2, tubular splice protection sleeve (42a) protects the splice (40), which may be fragile. Preferably, the sleeve comprises a high temperature (HT) resistant material, well known in the art, which resists degradation at the intended temperature of installation, which may be up to 300° C., or higher.

Another HT splice protection sleeve (42b) is provided at the end of the optical fiber (30) to help with deployment of the optical fiber (30) into a control line in a well bore. Epoxy coatings (46a, 46b, 46c) are applied at the junctions of the splice protection sleeves (42a, 42b) with the outer surface of optical fiber (30). The epoxy coatings (46a, 46b, 46c) taper from the end of the splice protection sleeve (42a, 42b) to the outer surface of the optical fiber (30) to prevent the ends of the splice protection sleeve (42a, 42b) from catching on an edge or minor surface defect that may exist within a control line tubing used to deploy the optical fiber (30) in a well bore.

In addition, or alternatively, the fiber may be recoated with a desired fiber optic coating material system to provide protection over the splice, such as re-applying a polyimide coating over each splice.

In some embodiments, the SM optical fiber segment (36) comprises at least one, and preferably a plurality of fiber Bragg gratings (FBG) (48). In the embodiment shown in FIG. 1, the SM optical fiber segment (36) comprises a plurality of FBGs (48a, 48b, 48c) spaced apart from each other. Other embodiments of the SM optical fiber segment (36) may have a different number of FBGs (48) without departing from the present invention. As a non-limiting example, an SM optical fiber segment (36) having a length of one meter may include between 2 and 1000, e.g. hundreds of FBGs (48).

An FBG (48) is a structure in the core of an optical fiber that acts to reflect light of a specific wavelength, referred to as its Bragg wavelength (L B) while permitting transmission of light of other wavelengths. FBGs are made by laterally exposing the core of a fiber to a periodic pattern of intense laser light. The exposure produces a permanent increase in the refractive index of the fiber's core, creating a fixed index modulation according to the exposure pattern, known as a grating. Manufacturing processes can be used to create FBGs (48) having desired nominal Bragg wavelengths at a specified temperature, such as in the range of about 1460 nm to about 1620 nm at a temperature of 20° C. Changes in temperature of the FBG (48) result in "shifts" (i.e., changes) to the Bragg wavelength of the FBG (48) from its nominal Bragg wavelength. Therefore, a calibration model can be developed to quantitatively relate shifted Bragg wavelengths to temperatures, so that the FBG (48) can be used as a temperature sensor. A technique for developing such a calibration model is described below under the heading "FBG Calibration".

The nominal Bragg wavelengths of the FBGs (48a, 48b, 48c) within the SM optical segment (32) may be the same as each other, or different from each other. In the latter case, as a non-limiting example, the nominal Bragg wavelengths of FBGs (48a, 48b, 48c) may be 1460 nm, 1540 nm, and 1620 nm, respectively. If the Bragg wavelength shifts for the FBGs (48a, 48b, 48c) are small (e.g., less than about 3 nm to 5 nm) over an expected temperature range (e.g., from 20° C. to 260° C.) in comparison to difference in nominal Bragg wavelengths between the FBGs (48a, 48b, 48c) (e.g., 80 nm in this example), the processing unit (20) can be used to discriminate between light reflected by the different FBGs (48a, 48b, 48c) on the basis of the shifted Bragg wavelength. Accordingly, the shifted Bragg wavelength can be attributed to a specific FBG (48a, 48b, 48c), and the temperature of the FBG (48a, 48b, 48c) can be associated with the known location of the FBG along the optical fiber (30).

DTS method FIG. 2 is a flow chart showing an embodiment of a method (100) for determining and calibrating a temperature data profile. The method (100) is implemented using the fiber optic transceiver (22) and the processor (26) of one embodiment of a DTS system (10) as described herein, under the control of instructions stored by the memory (27) and executed by the processor (26). At step (102), the fiber optic transmitter (23) is used to transmit an optical signal into the optical fiber (30). As the optical signal propagates through the optical fiber (30), the MM optical fiber segment (32) and the FBGs (48a, 48b, 48c) of the SM optical fiber segment (36) reflect light along the optical fiber (30) back to the fiber optic receiver (24). In response, the fiber optic receiver (24) generates electronic signals. At step (104), the processor (26) computes a temperature data profile along the optical fiber based on such signals. At step (106), the processor (26) computes temperature datum or data for the location(s) of the FBG(s) based on the signals. While steps (104) and (106) are shown as sequential in FIG. 2, they may be performed substantially simultaneously in real time.

Figure 3:
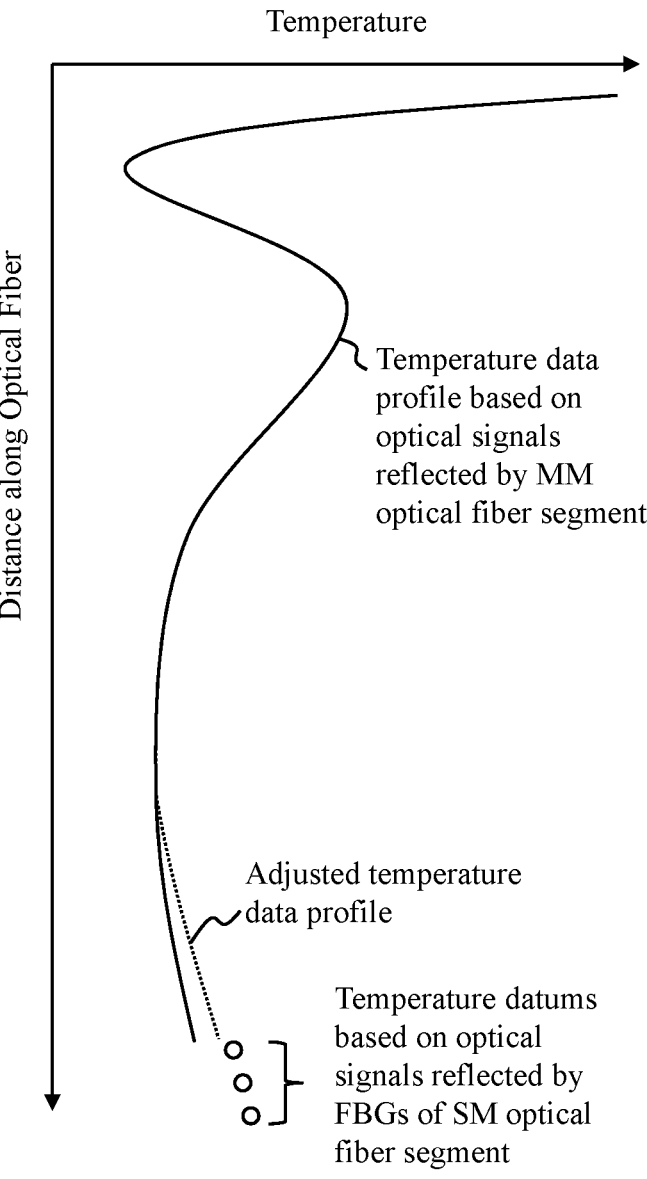
FIG. 3 shows a plot of a temperature data profile along the MM optical fiber segment, and temperature data at locations of FBGs of the SM optical fiber segment of the optical fiber.

FIG. 3 shows a plot of the computed temperature data profile along the MM optical fiber segment (32), and the computed temperature datum(s) for the locations of FBGs (48) of the SM optical fiber segment (36). At step (108), the processor or user (26) adjusts the computed temperature data profile based on the computed temperature datum(s), assuming that the latter is a more accurate indicator of actual temperature conditions. The present invention is not limited by how the adjustment is made. As a non-limiting example, as shown in FIG. 3, the adjustment may comprise mathematically "fitting" or converging the temperature data profile to or towards the computed temperature datum(s), based on a predefined mathematical rule, to produce an adjusted temperature data profile in the vicinity of the FBGs (48). At step (110), the processor (26) causes the display device (28) to display the adjusted temperature data profile, and/or information based thereon. As a non-limiting example, the display device (28) may display the plot shown in FIG. 3.

In alternative embodiments, the optical fiber may comprise only a SM fiber, or only a MM fiber, with FBGs distributed along the length of the optical fiber, or at a distal end of the optical fiber. The calibration of the DTS system essentially follows the same steps as described above, where the FBG computed temperature datum or data is used to adjust the DTS computed temperature data profile in the location of the FBG.

FBG Calibration.

The method (100) as described above is premised on the assumption that the temperature datum(s) computed using the FBGs (48) may be more accurate than the temperature data profile computed using the MM optical fiber segment (32). This assumption is itself premised on proper calibration of the FBGs (48) as temperature sensors. The following describes a method for calibrating a plurality of FBGs, having different nominal Bragg wavelengths, on a single optical fiber.

Figure 4:
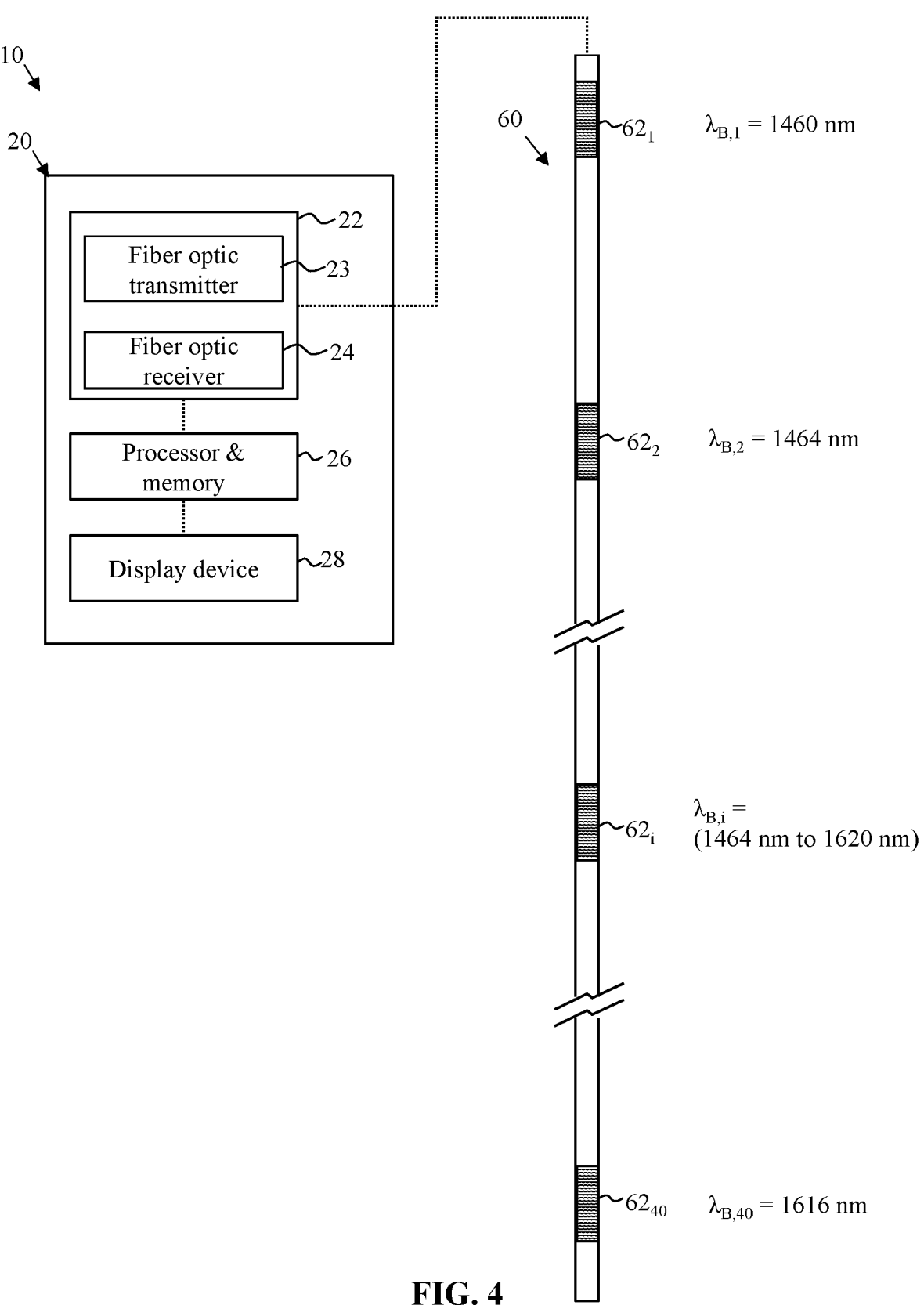
FIG. 4 is a schematic drawing of a processing unit and an SM optical fiber comprising a plurality of FBGs having different nominal Bragg wavelengths.

FIG. 4 shows the processing unit (20) of FIG. 1 operatively connected to an optical fiber (60), such as an SM fiber or an MM fiber, or a combination of the two. The optical fiber comprises a plurality (n) of FBGs (62) distributed along the length of the optical fiber (60). The FBGs (62) are differentiated by a subscript index, i, ranging from 1 to n. As a non-limiting example, there may be n=40 FBGs (62), spaced apart from each other by about 21.5 meters, with nominal Bragg wavelengths of the FBGs (62) increasing in increments of about 4 nm from 1460 nm for the first FBG (62) to about 1616 nm for the last FBG (62). The optical fiber (60) is exposed to different target temperatures (e.g., 50° C., 120° C., 190° C., and 260° C.), in a controlled environment. For each target temperature, the processing unit (20) is used to measure the shifted Bragg wavelength, while an independent temperature sensor, such as a thermocouple, is used to verify the actual target temperature. FIG. 5 shows an example of a paired dataset of shifted Bragg wavelength values and temperature values resulting from this process, obtained using a SM optical fiber. A regression analysis is performed on the paired dataset to determine the calibration model. As a non-limiting example, the calibration model may relate temperature (T) with the shifted Bragg wavelength ($\lambda$) in the below form, where $\lambda$, B, C and D are coefficients determined from a least squares linear regression of T with a $3^{rd}$ degree polynomial of $\lambda$.

$$T = A\lambda^3 + B\lambda^2 + C\lambda + D$$

The calibration model can be determined in this manner for each of the FBGs (62). That is, the constant coefficients (A, B, C, and D) are determined independently for each of the FBGs (62).

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of $\pm 5\%$, $\pm 10\%$, $\pm 20\%$, or $\pm 25\%$ of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method for calibrating a distributed temperature sensing (DTS) system comprising a fiber optic transmitter and receiver coupled to an optical fiber comprising a single mode (SM) fiber segment spliced to a multimode (MM) fiber segment, the method comprising the steps of:

(a) providing a plurality of fiber Bragg gratings (FBGs) within the SM fiber segment of the optical fiber, wherein a nominal Bragg wavelength of one of the FBGs differs from a nominal Bragg wavelength of another one of the FBGs;

(b) transmitting a light pulse into the optical fiber with the transmitter, and receiving backscattered light with the receiver;

(c) using at least one processor for:

(i) computing a DTS temperature data profile along a length of the optical fiber;

(ii) determining a temperature datum for a location of each of the plurality of FBGs based on signals generated by the fiber optic receiver in response to light reflections from each FBG, wherein the determination comprises:

analyzing each reflected signal to detect the associated Bragg wavelength;

determining the FBG associated with each detected Bragg wavelength by identifying the FBG with a nominal Bragg wavelength that most closely matches the detected Bragg wavelength;

comparing each detected Bragg wavelength to the nominal Bragg wavelength of the associated FBG to determine a corresponding wavelength shift; and determining the temperature datum at the predefined location of each FBG by applying an FBG-specific calibration model which relates the wavelength shift to a temperature; and iii) adjusting the DTS temperature data profile, based on the computed temperature datums for each location of each of the plurality of FBGs.

2. The method of claim 1, wherein the plurality of FBGs comprise 2 or more and 1000 or less FBGs.

3. The method of claim 1, wherein the plurality of FBGs comprise 3, 4 or 5 FBGs.

4. The method of claim 1, wherein the DTS temperature data profile is adjusted by shifting the profile to include the computed temperature datums for the locations of the plurality of FBGs.

5. The method of claim 1, wherein the optical fiber is deployed in a well bore for downhole temperature sensing.

6. The method of claim 1, initially comprising generating FBG-specific calibration models by exposing the optical fiber comprising the plurality of FBGs to a series of known target temperatures, measuring the shifted Bragg wavelength of each FBG at each target temperature, and performing a regression analysis on the paired dataset of temperature values and shifted Bragg wavelengths to determine the coefficients of a polynomial for each FBG.

7. A system for calibrating a distributed temperature sensing (DTS) system comprising a fiber optic receiver coupled to an optical fiber comprising a single mode (SM) fiber segment spliced to a multimode (MM) fiber segment, the system comprising:

(a) a plurality of fiber Bragg gratings (FBGs) integrally formed within the SM fiber segment of the optical fiber wherein a nominal Bragg wavelength of one of the FBGs differs from a nominal Bragg wavelength of another one of the FBGS;

(b) at least one processor operatively connected to the fiber optic receiver, and a non-transient computer readable medium storing instructions executable by the at least one processor to implement a method comprising:

(i) determining a temperature datum for a location of each of the plurality of FBGs based on signals generated by the fiber optic receiver in response to light reflections from each FBG, wherein the determination comprises:

analyzing each reflected signal to detect the associated Bragg wavelength;

determining the FBG associated with each detected Bragg wavelength by identifying the FBG with a nominal Bragg wavelength that most closely matches the detected wavelength;

comparing each detected Brage wavelength to the nominal Bragg wavelength of the associated FBG to determine a corresponding wavelength shift; and determining the temperature datum at the predefined location of each FBG by applying an FBG-specific calibration model which relates the wavelength shift to a temperature; and (ii) adjusting a computed temperature data profile along the optical fiber segment, based on the computed temperature datum for the location of the one FBG.

8. The system of claim 7 wherein the optical fiber comprises a single mode (SM) fiber or a multi-mode (MM) fiber, or a combination of SM and MM fiber segments.

9. The system of claim 8 wherein the optical fiber comprises a SM fiber segment spliced to a MM fiber segment, and the SM fiber segment comprises the one FBG.

10. The system of claim 7, wherein the plurality of FBGs comprise 2 or more and 1000 or less FBGs.

11. The system of claim 10, wherein the plurality of FBGs comprise 3, 4 or 5 FBGs.

12. The system of claim 7, wherein the optical fiber is deployed in a well bore for downhole temperature sensing.

* * * * *